D. MUNSON.
Lightning Rod.
No. 84,210. Patented Nov. 17, 1868.
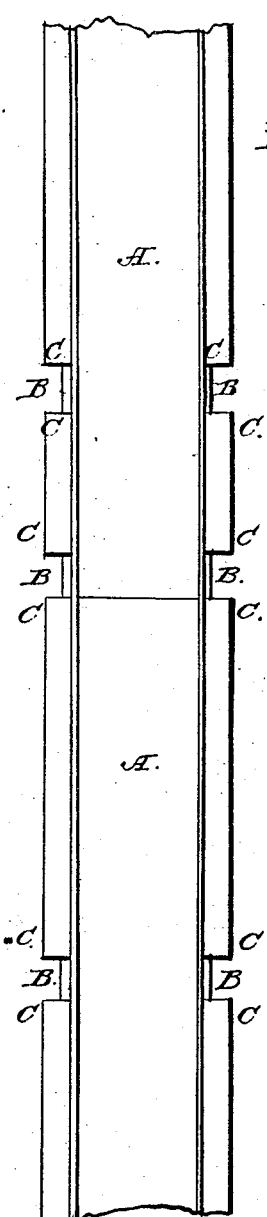
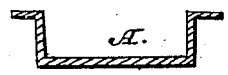
Witnesses
O. F. Mayhew
John W. Commons
Inventor,
David Munson

DAVID MUNSON, OF INDIANAPOLIS, INDIANA.

Letters Patent No. 84,210, dated November 17, 1868.

IMPROVEMENT IN LIGHTNING-RODS.

The Schedule referred to in these Letters Patent and making part of the same.

*To all whom it may concern:*

Be it known that I, DAVID MUNSON, of Indianapolis, in the county of Marion, and State of Indiana, have invented new and useful Improvements in Lightning-Rods; and I do hereby declare that the following is a full, clear, and exact description thereof, reference being had to the accompanying drawing, and to the letters of reference marked thereon, making part of this specification.

My invention relates to form of the rod, and to the mode of fastening together the sections of which it is composed, combining many receiving-points with large conducting-surface and an economical and substantial construction.

Figure 1 is a side view,

Figure 2, an edge view, and

Figure 3, an end section view of the rod.

Similar letters of reference indicate the same parts in the several figures.

The following description will enable skilled artisans to make and use my invention.

I make my lightning-rod of sheet-copper, cut into strips of suitable length and width for working, which are formed as shown in the drawing.

The sections A are lapped on to each other at the ends, and are firmly secured together by cutting into the edges so as to form lugs or ears B, which are turned down, as shown, leaving notches, and thus also forming points C along the edge of the rod to receive the electricity. The form of the rod makes a continuous gutter or trough, which it is designed to put up in such manner that all that portion of it that lies on the roof, or in a horizontal position, will have the open side up, so that it may receive and conduct the rain and dews that fall upon it to the ground, for the purpose of keeping it moist around the rod.

Having thus fully described my invention,

What I claim as new, and desire to secure by Letters Patent, is—

The lightning-conductor, composed of the sections A, formed and secured together as and for the purpose set forth.

DAVID MUNSON.

Witnesses:
O. F. MAYHEW,
JNO. M. COMMONS.